(12) United States Patent
Wang et al.

(10) Patent No.: US 8,155,940 B2
(45) Date of Patent: Apr. 10, 2012

(54) METHODS AND SYSTEMS FOR PREDICTING VERY HIGH CYCLE FATIGUE PROPERTIES IN METAL ALLOYS

(75) Inventors: Qigui Wang, Rochester Hills, MI (US); Bob R. Powell, Jr., Birmingham, MI (US); Peggy E. Jones, Saginaw, MI (US); Cherng-Chi Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 884 days.

(21) Appl. No.: 12/182,314

(22) Filed: Jul. 30, 2008

(65) Prior Publication Data

US 2010/0030537 A1 Feb. 4, 2010

(51) Int. Cl.
*G06G 7/48* (2006.01)
(52) U.S. Cl. .................................. 703/6; 703/7; 703/8
(58) Field of Classification Search ............... 703/2, 6–8
See application file for complete search history.

(56) References Cited

U.S. PATENT DOCUMENTS

| | | | |
|---|---|---|---|
| 6,912,913 B2* | 7/2005 | Murakami | 73/808 |
| 7,016,825 B1* | 3/2006 | Tryon, III | 703/6 |
| 7,623,973 B1* | 11/2009 | Wang et al. | 702/34 |
| 2008/0015827 A1* | 1/2008 | Tryon et al. | 703/2 |
| 2010/0299085 A1* | 11/2010 | Slycke et al. | 702/42 |

FOREIGN PATENT DOCUMENTS

DE 112004000995 T5 6/2006

OTHER PUBLICATIONS

Marines et al., An understanding of very high cycle fatigue of metals, International Journal of Fatigue, vol. 25, Issues 9-11, International Conference on Fatigue Damage of Structural Materials IV, Sep.-Nov. 2003, pp. 1101-1107.*
Liu et al., Multiaxial high-cycle fatigue criterion and life prediction for metals, International Journal of Fatigue, vol. 27, Issue 7, Jul. 2005, pp. 790-800.*
Francis G. Pascual, et al., Estimating Fatigue Curves With the Random Fatigue-Limit Model, pp. 1-31, 1997.

* cited by examiner

*Primary Examiner* — Dwin M Craig
*Assistant Examiner* — Aniss Chad
(74) *Attorney, Agent, or Firm* — Dinsmore & Shohl LLP (57) ABSTRACT

A system and method for predicting fatigue life in metal alloys for very high cycle fatigue applications. The system and method are especially useful for cast metal alloys, such as cast aluminum alloys, where a fatigue endurance limit is either non-existent or hard to discern. Fatigue properties, such as fatigue strength in the very high cycle fatigue region, are based on a modified random fatigue limit model, where the very high cycle fatigue strength and infinite life fatigue strength are refined to take into consideration the sizes of the discontinuities and microstructure constituents since the fatigue life scatter depends upon the presence of discontinuities and microstructure constituents. The sizes of the discontinuities and microstructure constituents that can initiate fatigue cracks can be determined with extreme value statistics, then input to the modified random fatigue limit model.

11 Claims, 6 Drawing Sheets

METHODS AND SYSTEMS FOR PREDICTING VERY HIGH CYCLE FATIGUE PROPERTIES IN METAL ALLOYS

BACKGROUND OF THE INVENTION

The present invention relates generally to methods and systems of predicting fatigue life in metal alloys, and more particularly to using probabilistic models and high cycle fatigue behavior for predicting very high cycle fatigue life in aluminum and related metals. Even more particularly, the invention relates to predicting fatigue life in cast aluminum alloy objects at very high cycle fatigue levels.

The increased demand for improving fuel efficiency in automotive design includes an emphasis on reducing component mass through the use of lightweight materials in the construction of vehicle component parts, including in the powertrain and related componentry. Cast lightweight non-ferrous alloys in general, and aluminum alloys in particular are increasingly being used in, but are not limited to engine blocks, cylinder heads, pistons, intake manifolds, brackets, housings, wheels, chassis, and suspension systems. In addition to making such components lighter, the use of casting and related scalable processes helps to keep production costs low.

As many of the applications of cast aluminum and other lightweight metal alloys in vehicle components involve very high cycle (generally, more than $10^8$ cycles, and often associated with between $10^9$ and $10^{11}$ cycles) loading, the fatigue properties, particularly the very high cycle fatigue (VHCF) properties, of the alloys are critical design criteria for these structural applications. Fatigue properties of cast aluminum components are strongly dependent upon discontinuities (that often initiate fatigue cracks), such as voids and related porosity, or oxide films or the like, that are produced during casting. Moreover, the probability of having a casting discontinuity in a given portion of the casting depends on many factors, including melt quality, alloy composition, casting geometry and solidification conditions. Given these factors, as well as inherent nonhomogeneities of the material, it can be appreciated that the nature of fatigue is probabilistic, where prediction of expected behavior over a range of loads is more meaningful that trying to establish a precise, reproducible fatigue value.

Despite this, there are factors that provide good indicators of fatigue behavior. For example, cracks readily initiate from large discontinuities that are located near or at the free surface of components and are subjected to cyclic loading, and the size of such cracking is important to determining the fatigue life of a component. As a general proposition, the resulting fatigue strength for a given number of cycles to failure, or life for a given load, is inversely proportional to the size of the discontinuities that initiate fatigue cracks.

Figure 1:
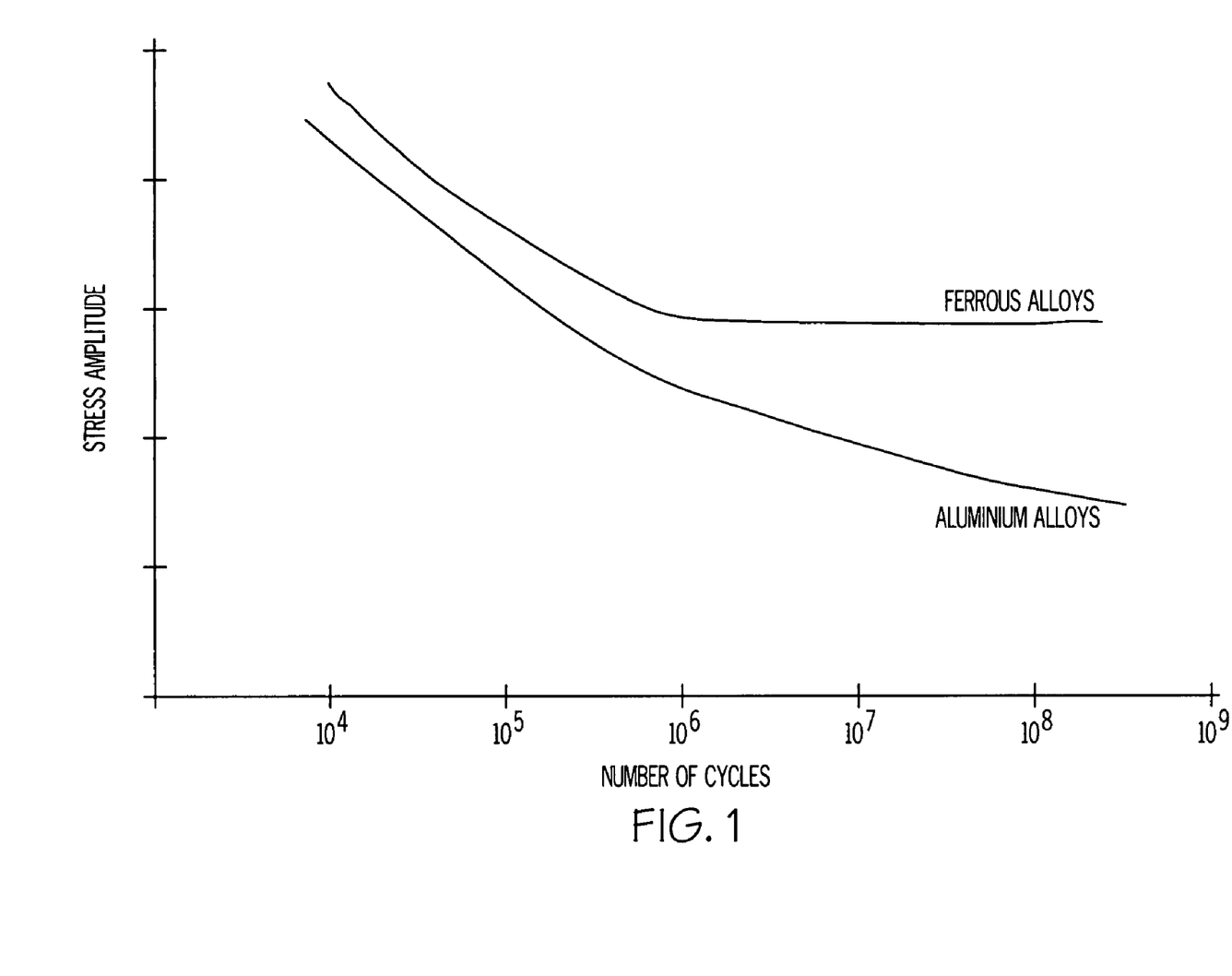
FIG. 1 shows a representative S-N plot for both a ferrous alloy and an aluminum alloy.
Figure 2A:
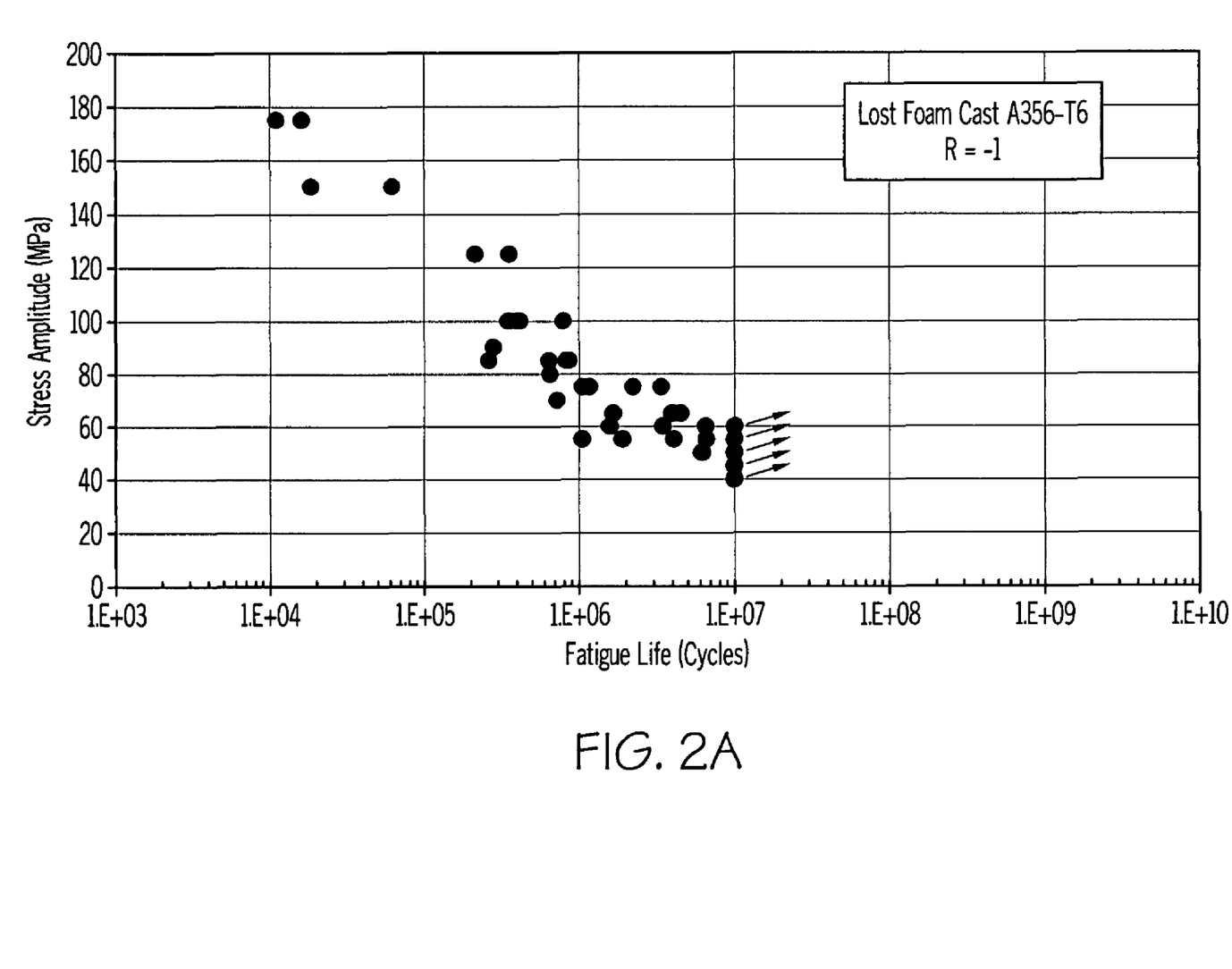
FIG. 2A shows a plot of data for an S-N test on a cast A356 aluminum alloy.

One particular form of fatigue, known as high cycle fatigue (HCF), is concerned with the repeated application of cyclic stresses for a large number of times. The most commonly-cited value for such large number of times is about ten million ($10^7$). The suitability of many structural materials (for example, ferrous-based and non-ferrous based alloys) for use in components and applications where HCF is a concern is often measured by familiar means, such as from the data in well-known S-N curves, examples of which are shown in FIGS. 1 and 2A where the number of completely reversed stress cycles that the material will survive decreases with an increase in stress level. Referring with particularity to FIG. 1, the fatigue strengths and corresponding S-N curves for many materials (for example, ferrous-based alloys) have a tendency to flatten out above a certain number of cycles at a stress known as the endurance limit. In general, the endurance limit is the maximum stress that may be applied to the material through an indefinite number of such completely reversed cycles without failure.

Unfortunately, aluminum-based alloys (also shown in FIG. 1) do not show a clearly-defined endurance limit, instead exhibiting successively lower levels of allowable cyclic stresses, for fatigue lives in the millions to trillions of cycles. Such alloys are considered to be generally not possessive of an endurance limit, or if possessive of one, are such that the endurance limit is not generally discernable or readily quantified. In either event, it is difficult to determine an appropriate design strength (under cyclic loading) and related material properties of cast aluminum alloys beyond either the HCF limit or those associated with very high cycle fatigue (VHCF, typically from about $10^8$ to $10^{11}$ or more cycles). Since long-term properties of components made from such alloys are critical to their success and are considered to be important design criteria for these components in structural applications, additional methods of determining strength and related properties for cast aluminum alloys in a manner generally similar to that used to predict the fatigue behavior of ferrous-based alloys are desired.

Figure 2B:
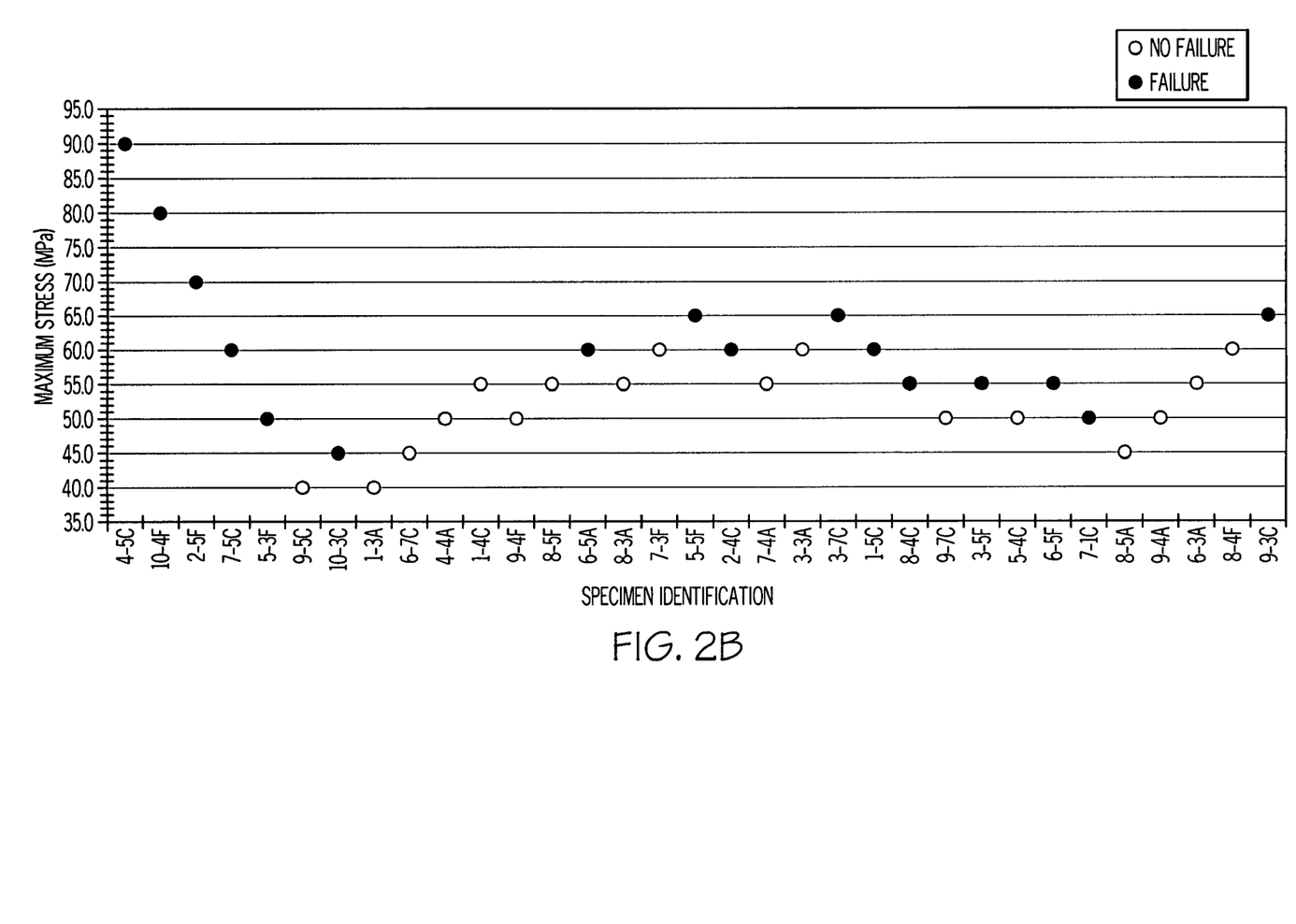
FIG. 2B shows a plot of data and procedure for a staircase fatigue test on a cast A356 aluminum alloy.

The well-known Wöhler test (the results of which can be used to produce the aforementioned S-N curve) and staircase fatigue test (the results of which are depicted in FIG. 2B) are commonly used to characterize the fatigue properties of materials for conventional HCF (e.g. $10^7$) life cycles. The statistical analysis of the results of these two fatigue tests is usually based on the assumption that the fatigue strength is normally distributed. As a result, the results generally agree for estimations of median fatigue strength, but show significant differences (up to, for example, a factor of two) in their standard deviation. One of the disadvantages of the staircase fatigue test is that the fatigue strength tested and calculated is restricted to a fixed number of cycles (for example, around $10^4$ cycles for low cycle fatigue (LCF), and $10^7$ cycles for HCF). In comparison with the staircase fatigue test, the S-N curve from the Wöhler test can offer fatigue strengths at different numbers of cycles to fracture. Whether using Wöhler or staircase testing, conventional servo-hydraulic fatigue testing systems operate at nominal frequencies of no more than a hundred or so cycles per second, making it time-wise impractical to generate S-N or related curves for VHCF applications, where $10^8$ through $10^{11}$ (or more) cycles are experienced. Accordingly, it would be desirable to be able to estimate strength and related material properties of cast aluminum alloys beyond the HCF limit, including the VHCF range.

BRIEF SUMMARY OF THE INVENTION

These desires are met by the present invention, wherein improved methods and systems that employ probabilistic approaches to estimate VHCF properties of cast aluminum and other non-ferrous alloys are disclosed. These approaches can be based on S-N and staircase fatigue data for conventional HCF (i.e., up to about $10^7$ cycles) and discontinuity and microstructure constituent populations in the materials of interest.

In accordance with a first aspect of the present invention, a method is used for predicting VHCF strength for a metal alloy. The method includes selecting an alloy where at least one fatigue crack initiation site is presumed or determined to be present and where the alloy is generally not possessive of an identifiable endurance limit. The method further includes inputting a discontinuity or microstructure constituent size representative of the fatigue crack initiation site. From that, the method can be used to calculate VHCF strength and an infinite life fatigue strength based on a modified random fatigue limit (MRFL) model.

Optionally, the MRFL model includes using Eqn. 2, discussed in more detail below. In a more particular version, the size of the discontinuity or microstructure constituent that initiates fatigue cracking is introduced in the model. This extends the MRFL model to be applicable to the same material but with different discontinuity and microstructure constituent populations. In a particular form, the metal alloy comprises a cast aluminum alloy. It will be appreciated by those skilled in the art that other non-ferrous metal alloys can be used, including wrought and related non-cast alloys, as well as those of other non-ferrous metals, such as magnesium. In another option, one or more fatigue crack initiation sites are determined by at least one of direct measurement and analytical prediction, where the direct measurement is selected from one of X-ray computed tomography, single and serial sectioning metallography, fractography or related methods. In another option, the infinite life fatigue limit follows a distribution according to Eqn. 3 that is discussed in more detail below. In an even more particular option, the size of the discontinuity or microstructure constituent follows a generalized extreme value distribution according to Eqn. 4 as discussed in more detail below. The present inventors have additionally discovered that fatigue performance of a given volume element in a cast aluminum component is controlled by extremes in the discontinuity and microstructure constituent size, and as such may benefit from the use of Extreme Value Statistics (EVS) in making predictions about the fatigue life of aluminum-based alloys. In situations where the fatigue life of the alloy extends beyond conventional HCF values and into the VHCF regime (for example, at least $10^8$ cycles), the applied stress is also used as a VHCF strength from Eqn. 2, discussed in more detail below.

In accordance with a second aspect of the present invention, an article of manufacture useable to predict fatigue life in metal castings is disclosed. The article of manufacture comprises a computer-usable medium having computer-executable instructions adapted to such fatigue life predictions. The computer-executable instructions comprise equations used to determine fatigue life properties based upon various constants, input conditions and nature of a fatigue-inducing condition. The article is particularly well-suited for predicting VHCF fatigue life, where an endurance limit associated with a metal casting is either not existent or not readily identifiable. In the present context, an endurance limit is considered non-existent when there is no substantially fixed maximum stress level below which a material can endure a substantially infinite number of stress cycles without failing. Likewise, the endurance limit is not readily identifiable if after a large number of stress cycles, an appropriate measure (for example, an S-N curve) does not reveal a substantially constant maximum stress level.

Optionally, the computer-readable program code portion for calculating the VHCF strength comprises using a generalized extreme value distribution in conjunction with the equations associated with the MRFL model.

In accordance with a third aspect of the present invention, an apparatus for predicting VHCF life in a metal alloy is disclosed. The apparatus includes a computing device such as discussed in the previous aspect, and may additionally include sample sensing equipment examples of which may include fatigue measuring components, as well as components capable of inducing and measuring tension, compression, impact and hardness properties of various structural materials under precisely controlled conditions. Such equipment (many examples of which are commercially available) may be operatively coupled to the computing device such that sensed data taken from the equipment can be operated upon by computer-readable software to, among other things, calculate fatigue properties of the sampled alloy. In other forms, the sample sensing equipment may be a sensor configured to identify discontinuities, cracks and related flaws that may serve as fatigue crack initiation sites. Such equipment may operate using machine vision or any other method known to those skilled in the art to detect such defects. The computing member includes program code to effect calculations of infinite life fatigue strengths based on one or more of the equations discussed below.

Optionally, the program further comprises at least one extreme value statistical algorithm to estimate an upper bound initiation site size expected to occur in the alloy. The code portion for calculating the infinite life fatigue strength comprises using the MRFL equations.

BRIEF DESCRIPTION OF THE SEVERAL VIEWS OF THE DRAWINGS

The following detailed description of the present invention can be best understood when read in conjunction with the following figures.

DETAILED DESCRIPTION OF THE PREFERRED EMBODIMENTS

Figure 4:
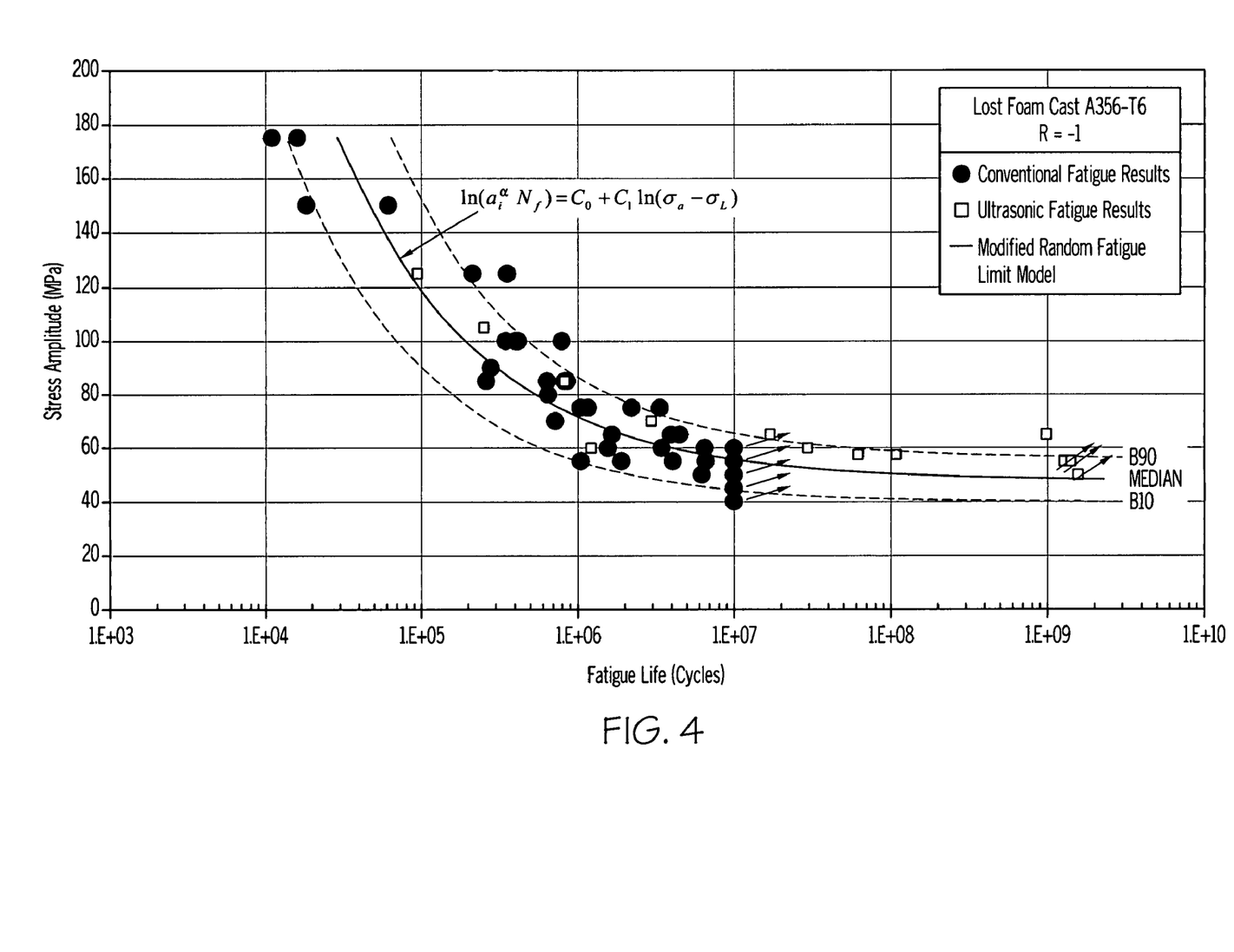
FIG. 4 shows an estimation of VHCF for a lost foam casting of A356 aluminum alloy using a MRFL model according to an embodiment of the present invention, as well as a comparison to the S-N data of FIG. 2A.

Referring with particularity to FIG. 4, the MRFL model is used to predict the fatigue strengths of cast aluminum components for very long lives ($10^8$ cycles and higher). The MRFL model proposed in this invention is based on an earlier random fatigue limit model where the finite fatigue lives can be calculated as follows:

$$\ln(N_f) = B_0 + B_1 \ln(S_a - S_L) + \xi \qquad (1)$$

where $\xi$ represents the scatter in fatigue lives, $B_1$ and $B_1$ are constants, and $S_L$ is the infinite fatigue limit of the specimen.

For a given stress state, the scatter of the fatigue lives of cast aluminum components is believed to be mainly related to the presence of discontinuities and microstructure constituents in general, and in particular to their sizes. As such, the present inventors felt that the random fatigue limit model of Eqn. 1 should be modified to incorporate the discontinuity and microstructure constituent sizes, thereby improving model accuracy and applicability to cast aluminum alloys. Eqn. 2 is a representation of how the random fatigue limit model of Eqn. 1 should be modified:

$$\ln(a_i^\alpha N_f) = C_0 + C_1 \ln(\sigma_a - \sigma_L) \qquad (2)$$

where $C_0$ and $C_1$ are empirical constants, $\alpha$ is a constant (in the range of 1-10), $\sigma_a$ is the applied stress, and $a_i$ is the size of the discontinuity or microstructure constituent at which the fatigue crack nucleates. In this invention, the $a_i$ is assumed to be equal to the defect size in the case of a volume containing a defect, to the second phase particle size, or to the size of the mean free path in the aluminum matrix. As with the value $S_L$ in Eqn. 1, $\sigma_L$ is the infinite life fatigue limit of the specimen. The present inventors believe that the infinite life fatigue limit $\sigma_L$ will follow a Weibull distribution given by Eqn. (3):

$$P = 1 - \exp\left(\frac{-\sigma_L}{\sigma_0}\right)^\beta \tag{3}$$

where P is the probability of failure at an infinite number of cycles, and $\sigma_0$ and $\beta$ are the Weibull parameters for the infinite life fatigue limit distribution.

In comparison with the earlier random fatigue limit model of Eqn. 1, the MRFL model of Eqn. 2 is not only more physically sound, but also more accurate in life prediction. For example, while the model constants in the earlier random fatigue limit model of Eqn. 1 have to be refitted when the discontinuity and material constituents change, even for the same alloy and material, no such change is needed in the MRFL model. Specifically, the model constants do not need to change for different populations of discontinuity and microstructure constituents in the same material and alloy. This is advantageous in that the discontinuity population can vary with normal process variation, such as seasonal humidity changes that affect the amount of hydrogen dissolved in the liquid aluminum, which in turn impacts the size of pores in the solidified component.

Referring to methods to estimate the parameters of a statistical distribution from a set of data, the Maximum Likelihood (ML) method is used by the inventors because of its good statistical properties. The main advantages of the ML method are the ability to correctly treat censored data and the fact that any distribution can be used (as long as the likelihood equations are known). The likelihood equations are functions of the experimental data and the unknown parameters that define the distribution.

In a staircase fatigue test, for instance, if a specimen tested at stress amplitude $\sigma_a$ does not fail after, say, $10^7$ cycles, it can be assumed that the fatigue strength for this specimen is certainly higher than $\sigma_a$. If the specimen fails, however, then the fatigue strength should be lower than $\sigma_a$. If $F(\sigma_a^i\{p\})$ is the cumulative density function for the distribution chosen to represent the fatigue strength variability in the staircase test, then the likelihood function for the staircase tests is defined as $$L = \prod_{i=1}^{n} F(\sigma_a^i, \{p\}) \cdot \prod_{j=1}^{m} [1 - F(\sigma_a^j, \{p\})] \tag{4}$$

where n corresponds to the number of failed specimens and m is the number of runouts, $\{p\}$ are the parameters that define the fatigue strength distribution for the specified number of cycles. In S-N tests, the likelihood of fatigue life for a given stress amplitude $\sigma_a$ can be defined as follows:

$$L = \prod_{i=1}^{n} f(N_F^i, \{p\}) \cdot \prod_{j=1}^{m} [1 - F(N_R^j, \{p\})] \tag{5}$$

where n corresponds to the number of failed specimens and m is the number of runouts, $f(N_F^i, \{p\})$ is the probability density function, $F(N_R^j, \{p\})$ is the cumulative density function, and $\{p\}$ are the parameters that define the fatigue life distribution for a given applied stress.

Figure 3:
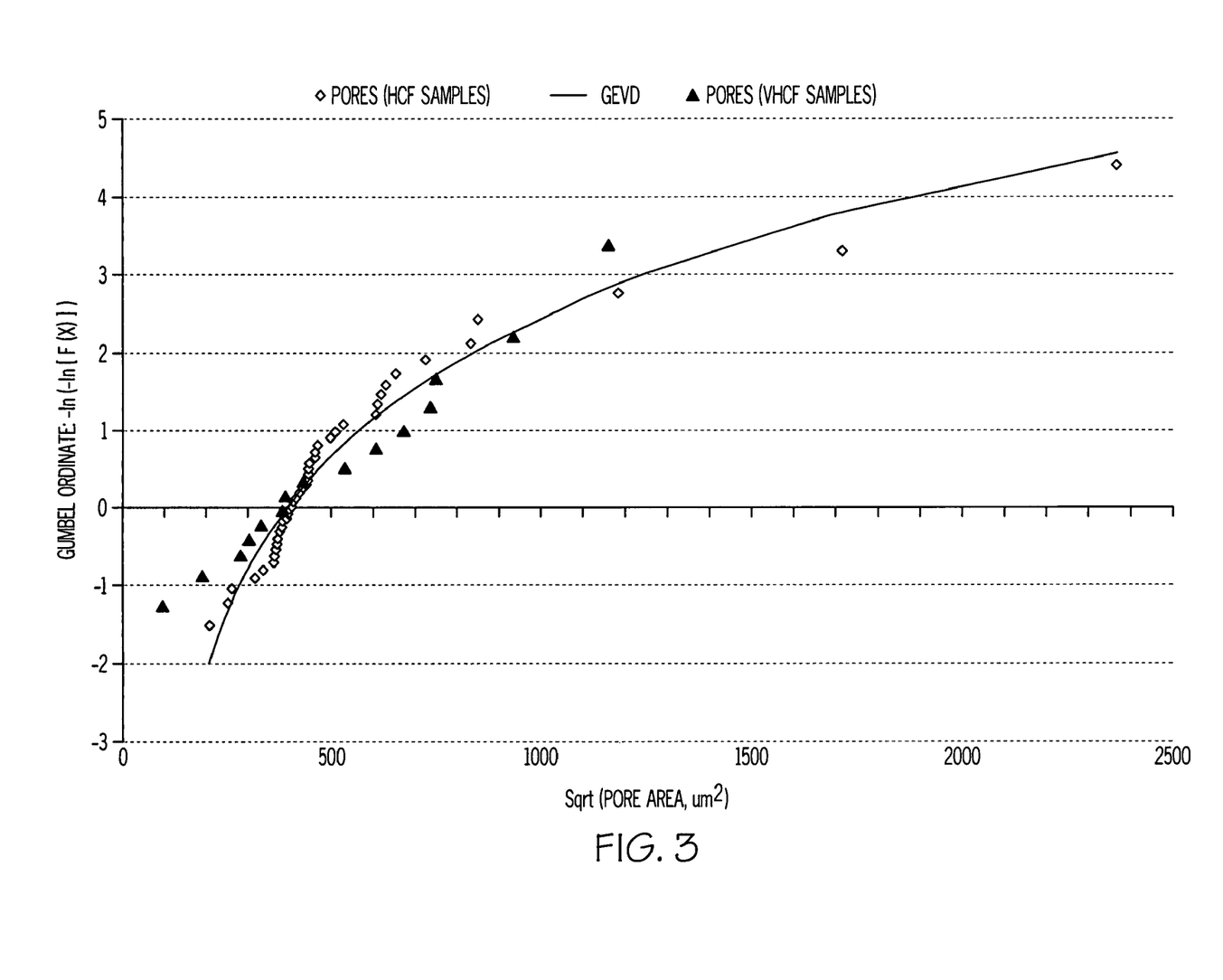
FIG. 3 shows a generalized extreme value distribution of porosity size characterized by the pore area for a cast A356 sample.

Referring next to probability of the size of discontinuity and microstructure constituents ($a_i$ in Eqn. 2) in a cast aluminum object, a generalized extreme value distribution is used. It is well known that fatigue cracks initiate at the largest "weak link" feature in the volume of material exposed to cyclic stress. Therefore when choosing the scale of fatigue crack initiator candidates, the upper bound of the available population should be considered. This is accomplished by estimating the upper bound using various EVS methods, or by directly measuring crack initiation sites which are themselves representative of the upper bound of the available population in a given volume. A representation of how the size of discontinuity or microstructure constituents follows a generalized extreme value distribution (GEVD) when the measurements were made directly from the crack initiation sites is as follows:

$$P = \exp\left(-\left(1 + c\left(\frac{a_i - \mu}{a_0}\right)\right)^{\frac{-1}{c}}\right) \tag{6}$$

where c, $a_0$ and $\mu$ are the GEVD parameters that represent the shape and scale of the probabilistic distribution function of $a_i$. The determination of three parameters, c, $a_0$ and $\mu$ is made by using the ML method. FIG. 3 shows an example of pore size (for example characterized as $a_i = \sqrt{porearea}$) using a GEVD for a cast A356 sample.

Metallographic techniques are widely utilized in practice to characterize casting flaws and microstructures in two dimensions (2D). With the conventional 2D metallographic data, the size distributions of casting flaws, inclusions and other microstructure features can be well described by EVS with a cumulative distribution function such as:

$$F(x) = \exp\left(-\exp\left(-\frac{x - \lambda}{\delta}\right)\right) \tag{7}$$

where x is the characteristic parameter of flaws or microstructural features, and $\lambda$ and $\delta$ are referred to as the EVS location and the scale parameters (also referred to as distribution parameters), respectively. It will be appreciated by those skilled in the art that while Eqn. 7 is used in the present disclosure to produce a cumulative distribution function, it is merely exemplary of such functions, and other similar distribution functions can be used to best fit the experimental data.

Considering a population of flaws or microstructure features as an example, an estimate of the distribution parameters $\lambda$ and $\delta$ can be made by different methods, where the most commonly used and convenient method is ordering/ranking statistics together with a linear regression. The characteristic flaw or microstructural feature parameters are ordered from the smallest to the largest with each assigned a probability based on its ranking j as follows:

$$F = \frac{j - 0.5}{n} \tag{8}$$

where n is the total number of data points. Eqn. 7 can be rearranged to a linear equation by twice taking its natural logarithm and transforming the parameters F(x) to ln(-ln F(x)) and the parameter x as follows:

$$-\ln(-\ln(F(x))) = \frac{1}{\delta} \cdot x - \frac{\lambda}{\delta}. \quad (9)$$

The EVS parameters $\lambda$ and $\delta$ can then be calculated from ML, moment or least squares methods. When the sample size is small (for example, approximately 30 flaws or microstructure features), the ML method gives the most efficient estimates. For a large number of samples (for example, where n from Eqn. 8 is greater than about 50), the ML, moment, and least square methods give similar precision.

The characteristic flaw or microstructure feature parameters predicted by EVS depend on the volume of material for which the prediction is sought. The volume effect is accounted for by the return period T, where two such periods, T and $T_b$, are considered. T accounts for the volume sampled compared to the volume of one part. The T return period of the maximal flaw or microstructure features in a given casting is usually determined by:

$$T = \frac{V}{V_0} \quad (10)$$

where V is the volume of a casting and $V_0$ is the volume of the specimen for flaw or microstructure features measurement.

Next, the volume effect is extrapolated to represent the population. The population is represented by a batch of N castings. The return period of the extreme flaw or microstructure features occurring once in a batch of N castings is:

$$T_b = T*N \quad (11)$$

Once the volume effects are accounted for, the characteristic flaw or microstructure feature parameters can be estimated using:

$$x(T_b) = \lambda - \delta \ln\left[-\ln\left(1 - \frac{1}{T_b}\right)\right] \quad (12)$$

and three sigma (i.e., minimum theoretical 99.94%) estimates on the maximal flaw or microstructure feature characteristic parameter can be made. The standard deviation is estimated by the Cramer-Rao lower bound:

$$SD[x(T_b)] = \frac{\delta}{\sqrt{n}} \cdot \sqrt{0.60793y^2 + 0.51404y + 1.10866} \quad (13)$$

where y, which is shown as:

$$y = -\left(\ln\left(1 - \frac{1}{T_b}\right)\right) \quad (14)$$

is the reduced variate of EVS, and n is the number of analyzed flaws or microstructure features.

The three sigma standard deviation confidence interval of $x(T_b)$ is given by $$x(T_b) + 3 \cdot SD[x(T_b)] \quad (15)$$

and x+3σ estimates of the maximum flaw or microstructure feature characteristic parameter in certain number of castings is given by:

$$x = \lambda - \delta \ln\left[-\ln\left(1 - \frac{1}{T_b}\right)\right] + 3(SD[x(T_b)]). \quad (16)$$

EVS can estimate the maximum 3D characteristic dimensions, which are otherwise difficult and costly to obtain, from readily available 2D measurements. It will be appreciated that if actual 3D dimensions for any given portion of a casting sample are determined, EVS may not be needed.

Referring again to FIG. 4, the predictions of the MRFL model compared with the experimental measurements in S-N curves show that incorporating discontinuity (such as porosity) size, calculated from Eqn. 6, in the MRFL model provides good fatigue property predictions, especially in the VHCF regime. Specifically, the predictions of the MRFL model compared with the experimental measurements in S-N curves show that incorporating second phase particle size estimated using Eqn. 6 in the MRFL model provides good fatigue property predictions.

Figure 5:
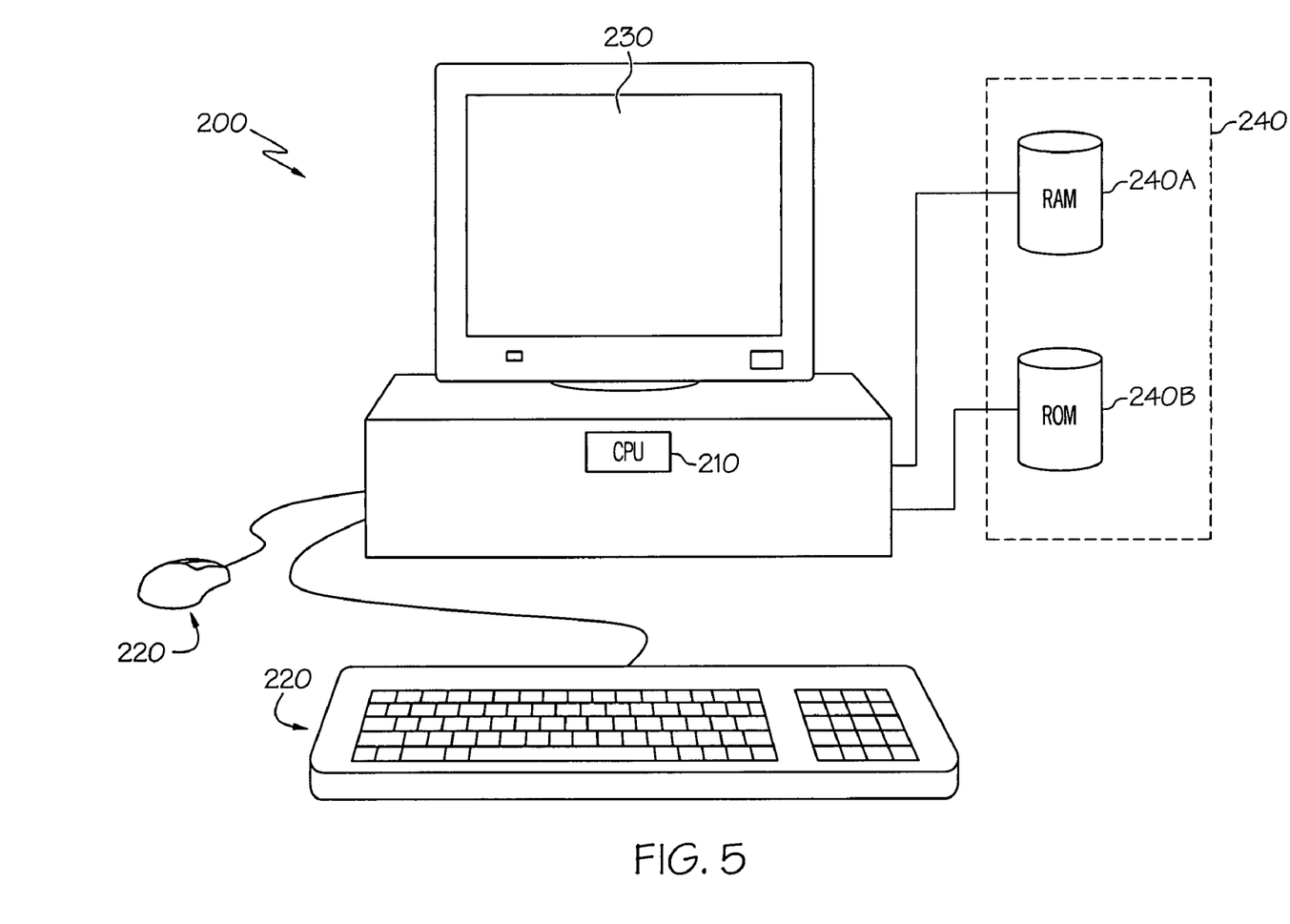
FIG. 5 shows an article of manufacture incorporating an algorithm employing one or more of the equations used in the MRFL model.

Referring next to FIG. 5, the MRFL model discussed above may be embodied in an algorithm that can be run on a computation device 200. Computation device 200 (shown in the form of a desktop computer, but understood by those skilled in the art as also capable of being a mainframe, laptop, handheld, cellular or other related microprocessor-controlled device) includes a central processing unit 210, input 220, output 230 and memory 240, the latter of which may include random access memory (RAM) 240A and read-only memory (ROM) 240B, where the former generally refers to volatile, changeable memory and the latter to more permanent, non-alterable memory. With recent developments, such distinctions between RAM 240A and ROM 240B are becoming increasingly evanescent, and while either ROM 240B or RAM 240A could be used as a computer-readable medium upon which program code representative of some or all of the aforementioned fatigue life prediction equations can be run, it will be understood by those skilled in the art that when such program code is loaded into the computation device 200 for subsequent reading and operation upon by the central processing unit 210, it will typically reside in RAM 240A. Thus, in one preferable form, the algorithm can be configured as computer-readable software such that when loaded into memory 240, it causes a computer to calculate fatigue life based on a user's input. The computer-readable medium containing the algorithm can additionally be introduced into computation device 200 through other portable means, such as compact disks, digital video disks, flash memory, floppy disks or the like. Regardless of the form, upon loading, the computer-readable medium includes the computer-executable instructions adapted to effect the decision-making process of the MRFL model. As will be appreciated by those skilled in the art, the computation device 200 may optionally include peripheral equipment. Moreover, the computation device 200 may form the basis for a system that can be used to predict fatigue life in aluminum castings. The system may additionally include measuring, testing and sampling equipment (not shown) such that fatigue data taken directly from a sample casting may be loaded into memory 240 or elsewhere for subsequent comparison to predicted data or the like.

While certain representative embodiments and details have been shown for purposes of illustrating the invention, it will be apparent to those skilled in the art that various changes may be made without departing from the scope of the invention, which is defined in the appended claims.

What is claimed is:

1. A computer-implemented method of predicting very high cycle fatigue strength for a cast aluminum-based metal alloy, said method comprising:
   providing a computer-based system comprising an input, an output, a central processing unit and memory;
   introducing program code into at least one of said input, memory and central processing unit from a computer-readable medium having a non-transitory form of said program code embodied therein;
   operating said program code such that calculations made thereby are performed by said central processing unit;
   selecting an alloy where at least one fatigue crack initiation site is presumed or determined to be present therein and where said alloy is generally not possessive of an identifiable endurance limit;
   inputting into said system a size of discontinuity or microstructure constituent representative of said at least one fatigue crack initiation site;
   inputting into said system a finite life fatigue strength that corresponds to said alloy; and calculating with said program code an infinite life fatigue strength and said very high cycle fatigue strength using a modified random fatigue limit model which comprises using the equation $$\ln(a_i^\alpha N_f) = C_0 + C_1 \ln(\sigma_a - \sigma_L)$$

where $a_i$ is said size of discontinuity or microstructure constituent, $N_f$ is fatigue life, $C_0$ and $C_1$ are constants, $\alpha$ is a constant substantially in the range of between one and ten, $\sigma_a$ is an applied stress, and $\sigma_L$ is a measure of said infinite life fatigue strength.

2. The method of claim 1, wherein said applied stress comprises said very high cycle fatigue strength in situations where said fatigue life is at least $10^8$ cycles.

3. The method of claim 1, wherein a distribution of said infinite life fatigue strength substantially follows the equation $$P = 1 - \exp\left(\frac{-\sigma_L}{\sigma_0}\right)^\beta$$

where P is the probability of failure at an infinite number of cycles, and $\sigma_0$ and $\beta$ are parameters for a distribution of said infinite life fatigue strength.

4. The method of claim 1, wherein at least one fatigue crack initiation site is determined by at least one of direct measurement and analytical prediction.

5. The method of claim 4, wherein said direct measurement comprises at least one of X-ray computed tomography, single and serial sectioning metallography and fractography.

6. The method of claim 1, wherein said size of said discontinuity or microstructure constituent follows a generalized extreme value distribution according to the equation:

$$P = \exp\left(-\left(1 + c\left(\frac{a_i - \mu}{a_0}\right)\right)^{\frac{-1}{c}}\right)$$

where $c$, $a_0$ and $\mu$ are generalized extreme value parameters used to represent at least one of a shape and a scale of a probabilistic distribution function of $a_i$.

7. The method of claim 6, wherein said extreme value distribution is used in conjunction with at least one of 2D metallographic techniques, fractographic techniques, X-ray computed tomography and computational simulation and modeling to estimate values representing a population of said size of discontinuity or microstructure constituent.

8. An article of manufacture comprising a computer-usable medium having computer-readable program code embodied therein for calculating at least one very high cycle fatigue property in an aluminum-based metal casting where an endurance limit associated with said metal casting is either not existent or not readily identifiable, said computer-readable program code in said article of manufacture comprising:
   computer-readable program code portion for causing a computer to determine an infinite life fatigue strength of said metal casting where at least one fatigue crack initiation site is presumed or determined to be present therein;
   computer-readable program code portion for receiving a discontinuity size representative associated with said at least one fatigue crack initiation site;
   computer-readable program code portion for calculating said at least one very high cycle fatigue property based on a modified random fatigue limit model wherein said computer-readable program code portion for calculating said at least one very high cycle fatigue property comprises using the equation $$\ln(a_i^\alpha N_f) = C_0 + C_1 \ln(\sigma_a - \sigma_L)$$

to effect said modified random fatigue limit model, where $a_i$ is said discontinuity and microstructure constituent size, $N_f$ is fatigue life, $C_0$ and $C_1$ are empirical constants, $\alpha$ is a constant substantially in the range of between one and ten, $\sigma_a$ is an applied stress and $\sigma_L$ is a measure of infinite life fatigue strength; and
   computer-readable program code portion configured to output results calculated by said modified random fatigue life model to at least one of a machine-readable format and a human-readable format.

9. The article of manufacture of claim 8, wherein said computer-readable program code portion for calculating said at least one very high cycle fatigue property comprises using a generalized extreme value distribution in conjunction with a modified random fatigue limit model.

10. An apparatus for predicting fatigue life in an aluminum-based metal alloy where an endurance limit associated with the alloy is either not existent or not readily identifiable, said apparatus comprising:
   a device configured to acquire at least one of measured or predicted fatigue crack initiation site information; and
   a computing member configured to accept fatigue property data gathered from said device and further configured to calculate at least one of a very high cycle fatigue strength and an infinite fatigue life strength of the alloy in accordance to instructions provided by a computer-readable program, said program comprising:
      a code portion for causing said computing member to determine said at least one of a very high cycle fatigue strength and an infinite life fatigue strength of the alloy where at least one fatigue crack initiation site is presumed or determined to be present therein;
      a code portion for receiving at least one of a discontinuity size and a microstructure constituent size associated with said at least one fatigue crack initiation site;
      a code portion for calculating said at least one of a very high cycle fatigue strength and an infinite fatigue life strength based on a modified random fatigue limit model wherein said computer-readable program code portion for calculating said at least one of a very high cycle fatigue strength and an infinite life fatigue strength comprises using the equation $$\ln(a_i^\alpha N_f) = C_0 + C_1 \ln(\sigma_a - \sigma_L)$$

to effect said modified random fatigue limit model, where $a_i$ is said discontinuity and microstructure constituent size, $N_f$ is fatigue life, $C_0$ and $C_1$ are empirical constants, $\alpha$ is a constant substantially in the range of between one and ten $\sigma_a$ is an applied stress and $\sigma_L$ is a measure of said infinite life fatigue strength; and a code portion configured to output results calculated by said modified random fatigue limit model to at least one of a machine-readable format and a human-readable format.

11. The apparatus of claim 10, wherein said program further comprises at least one extreme value statistical algorithm to estimate an upper bound initiation site size expected to occur in the alloy.

* * * * *